US012800895B2

(12) United States Patent
Someya et al.

(10) Patent No.: US 12,800,895 B2
(45) Date of Patent: Nov. 17, 2026

(54) LIGHT-EMITTING DEVICE

(71) Applicant: AGC Inc., Tokyo (JP)

(72) Inventors: Takenori Someya, Shizuoka (JP); Kazuo Yamada, Tokyo (JP)

(73) Assignee: AGC Inc., Tokyo (JP)

( * ) Notice: Subject to any disclaimer, the term of this patent is extended or adjusted under 35 U.S.C. 154(b) by 197 days.

(21) Appl. No.: 18/768,153

(22) Filed: Jul. 10, 2024

(65) Prior Publication Data

US 2024/0361583 A1 Oct. 31, 2024

Related U.S. Application Data

(63) Continuation of application No. PCT/JP2023/005794, filed on Feb. 17, 2023.

(30) Foreign Application Priority Data

Mar. 3, 2022 (JP) ................................ 2022-032931
Nov. 17, 2022 (JP) ................................ 2022-184082

(51) Int. Cl.
*G02B 19/00* (2006.01)
*G02B 5/02* (2006.01)

(52) U.S. Cl.
CPC ......... *G02B 19/0061* (2013.01); *G02B 5/021* (2013.01); *G02B 19/0014* (2013.01)

(58) Field of Classification Search
CPC . G02B 19/0061; G02B 5/021; G02B 19/0014
See application file for complete search history.

(56) References Cited

U.S. PATENT DOCUMENTS 7,053,419 B1 * 5/2006 Camras ................ H10H 20/855 257/E33.068
2013/0069104 A1 3/2013 Ichikawa
(Continued)

FOREIGN PATENT DOCUMENTS

JP 2007-19133 A 1/2007
JP 2012-527110 A 11/2012
(Continued)

OTHER PUBLICATIONS

JP 2007019133 A (Horikoshi Hiroshi et al.) machine translation (Year: 2007).*

*Primary Examiner* — James A Dudek
(74) *Attorney, Agent, or Firm* — Oblon, McClelland, Maier & Neustadt, L.L.P.

(57) ABSTRACT

A light-emitting device including:

a light-emitting element; and a lens joined to the light-emitting element, wherein the light-emitting element has a rectangular light emission surface facing the lens, wherein the lens includes: an opposing surface facing the light-emitting element; and a convex surface oriented in an opposite direction to the opposing surface, and wherein as seen in a direction perpendicular to the light emission surface, a circumferential edge of the convex surface is circular, and, when a distance between a center of the convex surface and a center of the light emission surface is denoted by Δ (unit: μm); a length of a shortest edge of the light emission surface is denoted by L (unit: mm); a diameter of the circumferential edge of the convex surface is denoted by R (unit: mm); and R/L is denoted as r; formula (1):

$$0 < \Delta \leq 450/r \tag{1}$$

is satisfied.

16 Claims, 8 Drawing Sheets

(56) References Cited

U.S. PATENT DOCUMENTS

| | | | | |
|---|---|---|---|---|
| 2015/0048398 | A1 | 2/2015 | Ichikawa et al. | |
| 2016/0027975 | A1* | 1/2016 | Kitamura | H10H 20/853<br>438/27 |
| 2018/0159000 | A1 | 6/2018 | Doi et al. | |
| 2022/0157770 | A1 | 5/2022 | Shimatsu et al. | |

FOREIGN PATENT DOCUMENTS

| | | | |
|---|---|---|---|
| JP | 5725022 | B2 | 5/2015 |
| JP | 2016-6832 | A | 1/2016 |
| JP | 2016-111085 | A | 6/2016 |
| JP | 2017-521872 | A | 8/2017 |
| JP | 6257446 | B2 | 1/2018 |
| JP | 6299478 | B2 | 3/2018 |
| JP | 2019-212871 | A | 12/2019 |
| JP | 2021-41458 | A | 3/2021 |
| WO | WO 2010/131090 | A1 | 11/2010 |
| WO | WO 2016/014762 | A1 | 1/2016 |
| WO | WO 2016/190207 | A1 | 12/2016 |
| WO | WO 2021/039730 | A1 | 3/2021 |

* cited by examiner

LIGHT-EMITTING DEVICE

BACKGROUND OF THE INVENTION

1. Field of the Invention

The disclosures herein relate to a light-emitting device.

2. Description of the Related Art

An ultraviolet light-emitting element package referred to in PTL 1 includes an ultraviolet light-emitting element and a convex lens. Using the convex lens can prevent a total reflection of light and improve light-extracting efficiency. A bottom of the convex lens and a light-extracting surface are bonded by a refractive index relaxing material layer. The refractive index relaxing material layer is composed of carboxyl amorphous fluororesin.

An LED element and an inorganic glass molded body referred to in PTL 2 are joined by silicone resin. A light-emitting element and a lens referred to in PTL 3 are joined by a surface-activated bonding technique. In PTL 3, "a surface-activated bonding technique" refers to a technology of activating joining surfaces of a light-emitting element and a lens by ion beams or plasma, and directly joining the light emitting element and the lens at the joining surfaces.

A light-emitting device and an optical member in PTL 4 are joined by using an atomic diffusion bonding process. PLT 5 refers to using an oxide film instead of a metal film for an atomic diffusion bonding process. PTL 6 discloses a sealing agent for an ultraviolet light-emitting diode (UV-LED). The sealing agent includes an organic-inorganic hybrid polymer.

Conventionally, an effect of misalignment at a time of joining a light-emitting element and a lens has not been sufficiently considered.

One embodiment of the present disclosure provides a technique to control imbalance of light emission strength distribution by containing misalignment caused when joining a light-emitting element and a lens within an allowable range, and to improve yields.

CITATION LIST

Patent Literature

[PTL1] Japanese Laid-Open Patent Publication No. 2016-111085

[PTL 2] International Publication WO2016/190207

[PTL 3] Japanese Patent No. 5725022

[PTL 4] Japanese Patent No. 6299478

[PTL 5] Japanese Laid-Open Patent Publication No. 2021-41458

[PTL 6] Japanese Patent No. 6257446

SUMMARY OF THE INVENTION

A light-emitting device including:

a light-emitting element; and a lens joined to the light-emitting element, wherein the light-emitting element has a rectangular light emission surface facing the lens, wherein the lens includes: an opposing surface facing the light-emitting element; and a convex surface oriented in an opposite direction to the opposing surface and, wherein as seen in a direction perpendicular to the light emission surface, a circumferential edge of the convex surface is circular, and, when a distance between a center of the convex surface and a center of the light emission surface is denoted by Δ (unit: μm); a length of a shortest edge of the light emission surface is denoted by L (unit: mm); a diameter of the circumferential edge of the convex surface is denoted by R (unit: mm); and R/L is denoted as r; formula (1):

$$0 < \Delta \leq 450/r \tag{1}$$

is satisfied.

According to one embodiment of the present disclosure, by containing misalignment caused when joining a light-emitting element and a lens within an allowable range, imbalance of light emission strength distribution can be controlled and yields can be improved.

DESCRIPTION OF THE PREFERRED EMBODIMENTS

In following, the embodiments of the present invention will be described with reference to the accompanying drawings. In the present description, a mark "–" showing a number range means that the numbers next to the mark are included in the range as the lowest and the highest values.

Figure 1:
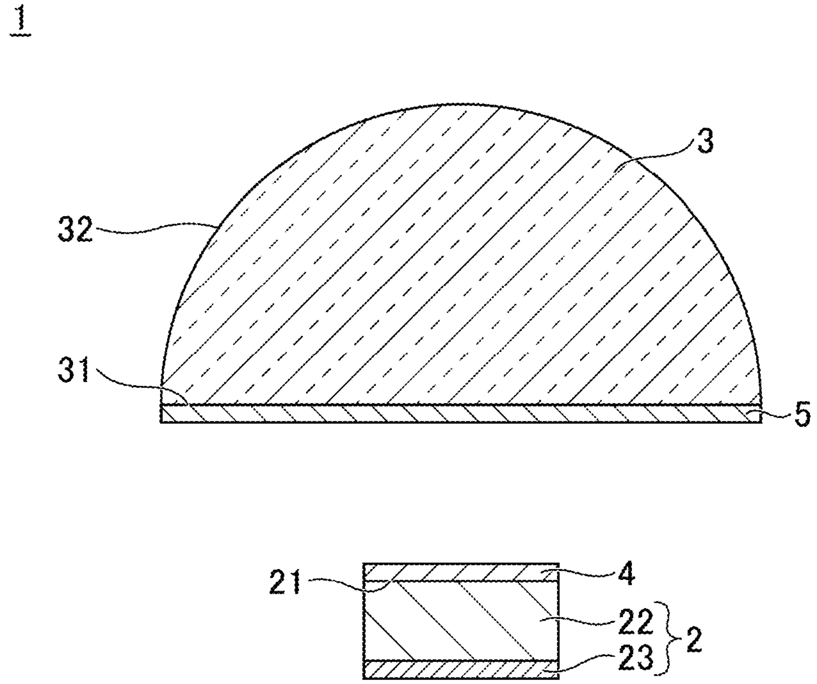
FIG. 1 is a cross section illustrating a FIG. 1 condition before joining a light-emitting element and a lens constituting a light-emitting device related to one embodiment.
Figure 2:
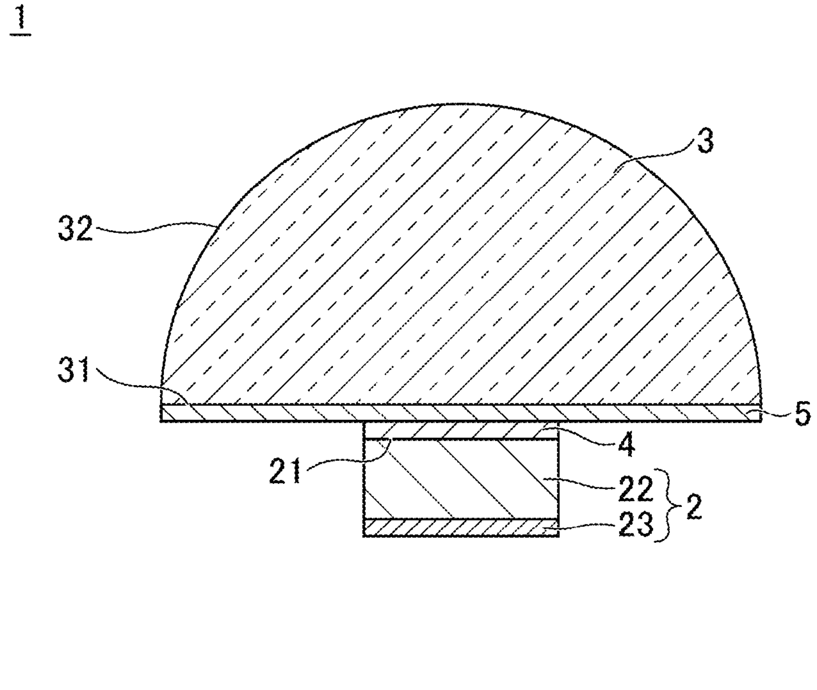
FIG. 2 is a cross section illustrating a light-emitting device related to one embodiment.
Figure 3:
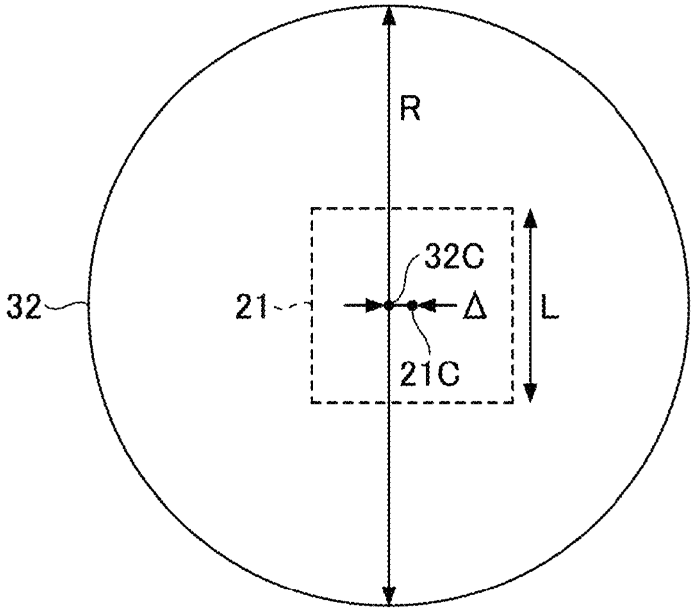
FIG. 3 is a front view illustrating one example of misalignment caused when joining a light-emitting element and a lens.

Referring to FIG. 1-FIG. 3, a light-emitting device 1 related to one embodiment is described. The light-emitting device 1 includes a light-emitting element 2, and a lens 3 joined to the light-emitting element 2. Light generated by the light-emitting element 2 is extracted outside through the lens 3. Using the lens 3 can prevent a total reflection of light, and improve light-extracting efficiency.

Although the light-emitting device 1 includes one light-emitting element 2 and one lens 3, it may include a plurality of light-emitting elements 2 and a plurality of lenses 3. In the latter case, for each of a plurality of light-emitting elements 2, a corresponding lens 3 is used in 1-to-1 relationship. A plurality of lenses 3 may be installed on one side of a plate, each made of the same material as the lens 3, and a plurality of the light-emitting elements 2 may be installed on the opposite side of the plate.

The light-emitting element 2 is, for example, an ultraviolet emitting element. The ultraviolet may be any of UVC (200-280 nm of wavelength), UVB (280-315 nm of wavelength), or UVA (315-400 nm of wavelength). Moreover, the light-emitting element 2 may also be a visible light emitting element or an infrared emitting element.

The light-emitting element 2 includes a substrate 22 and a semiconductor layer 23. The light-emitting element 2 has, for example, a flip chip structure. When the light-emitting element 2 has a chip flip structure, light generated in the semiconductor layer 23 is emitted through the substrate 22, and the substrate 22 forms a light emission surface 21. The light emission surface 21 is opposite to the lens 3.

The substrate 22 is, for example, made of a sapphire substrate or an aluminum nitride substrate. An aluminum nitride substrate is a substrate made of monoctystalline aluminum nitride. Thickness t of the substrate 22 is, for example, 0.05-2 mm.

The semiconductor layer 23 is provided on the opposite side of the substrate 22 from the lens 3. The semiconductor layer 23 emits light by applying voltage. An electrode to apply voltage to the semiconductor layer 23, not shown, is formed opposite of the semiconductor layer 23 from the substrate 22, in order not to block the light from the semiconductor layer 23 to the substrate 22. Therefore, lowering light-extracting efficiency by the electrode can be prevented.

The light-emitting element 2 may be joined to an installed substrate through a solder bump. An installed substrate is a ceramic substrate, made of, for example an aluminum nitride sintered body, an aluminum oxide sintered body, or LTCC (LOW Temperature Co-fired Ceramics), with electrodes formed.

The lens 3 includes an opposite surface 31 opposite to the light-emitting element 2, and a convex surface 32 facing a side opposite to the opposite surface 31. Light generated by the light-emitting element 2 enters the opposite surface 31 and is emitted from the convex surface 32. The convex surface 32 is a dome-shaped curved surface whose center protrudes relative to a circumferential edge.

The lens 3 may be a spherical lens or an aspherical lens, but a spherical lens is preferable from a perspective of light-extracting efficiency. Therefore, it is preferable for the convex surface 32 to be a part of a spherical surface.

Moreover, although not shown, the lens 3 may include a flange protruding from the circumferential edge of the convex surface 32 radially outward.

The material of the lens 3 is, for example, an oxide glass. Oxide glass can be processed by various processing methods, such as a grinding-polishing process, and a processing method suitable for a shape of the lens 3 can be chosen. The oxide glass is, for example, a soda-lime glass, alkali-free glass, chemically strengthened glass, lanthanum borate glass, etc. In order to reduce a loss of light by the lens 3, a material having a low absorption factor in a wide wavelength region is suitable for the material of the lens 3. The material of the lens 3 may be quartz, quartz glass, or sapphire crystal.

The light-emitting element 2 and the lens 3 are joined by opposing the light emission surface 21 of the light-emitting element 2 and the opposite surface 31 of the lens 3. The light emission surface 21 and the opposite surface 31 are referred to as joining surfaces below. Surface roughness Ra of the light emission surface 21 of the light-emitting element 2 is, for example, 0.01-5 nm. When a minute uneven structure is formed on the light emission surface 21 in order to improve the light-extracting efficiency of the light-emitting element 2, surface roughness Ra of the light emission surface 21 is 5-50 nm. Surface roughness Ra of the opposite surface 31 of the lens 3 is, for example, 0.01-5 nm.

The light emission surface 21 and the opposite surface 31 are planar respectively, but they may also be convex or concave. An overlapping region of the light emission surface 21 and the opposite surface 31 is preferably planar, and the remaining region may also be convex or concave.

The light-emitting element 2 and the lens 3 are joined by, for example, a surface-activated bonding technique. The surface-activated bonding technique includes a hydrophilization bonding technique. In the surface-activated bonding technique, oxide films, nitride films, or oxynitride films may be used as joining films 4, 5.

The surface-activated bonding technique includes, for example, a sequential plasma method. The sequential plasma method includes, for example, reactive ion etching (RIE) using oxygen gas, reactive ion etching using nitrogen gas, and radiation of nitrogen radicals.

Reactive ion etching using oxygen gas is referred to as "oxygen RIE" below. Moreover, reactive ion etching using nitrogen gas is referred to as "nitrogen RIE". Moreover, the sequential plasma method may include nitrogen RIE and radiation of nitrogen radicals, and is not required to include oxygen RIE.

The sequential plasma method reforms the joining surfaces. The reformed surfaces contact vapor, water, etc. and OH groups, which are hydrophilic groups, are formed on the joining surfaces. Then, when joined, OH groups form hydrogen bonds and high joining strength can be obtained. After joining, annealing may be performed. By annealing, hydrogen bonds change into covalent bonds and higher joining strength can be obtained.

The inventors confirmed by experiments that when a joining surface of 100 mol % $SiO_2$ containing material (quartz or quartz glass) is reformed by a sequential plasma method, higher joining strength can be obtained, than in the case of reforming only using oxygen RIE.

However, when a joining surface of 70 mol % or less $SiO_2$ containing material is reformed by a sequential plasma method, compared to the case of reforming only using oxygen RIE, only a similar extent of joining strength is obtained.

The inventors performed more experiments to find that when at least one of two members to be joined low $SiO_2$, the sequential plasma method can improve joining strength by forming a silicon oxide film on the joining surface of the member beforehand.

Before surface reformation, a silicon oxide film contains few impurities outside the oxygen and silicon, similar to quartz or quartz glass. Therefore, if a joining surface of a silicon oxide film is reformed by the sequential plasma method, joining strength as high as in the case of reforming a joining surface of quartz glass by the sequential plasma method can be obtained.

When the substrate 22 of the light-emitting element 2 is a sapphire substrate or an aluminum nitride substrate, the substrate 22 contains little $SiO_2$. Then, in this case, by forming a silicon oxide film as the joining film 4, on the light emission surface 21 of the substrate 22 joining strength can be improved using the sequential plasma method. The joining film 4 formed on the light emission surface 21 of the light-emitting element 2 is also referred to as the first joining film 4 below.

The lens 3 is, as mentioned above, for example, soda-lime glass, alkali-free glass, chemically strengthened glass, lanthanum borate glass, etc. These glasses contain $SiO_2$ 70 mol % or less. If a silicon oxide film is formed as a joining film 5 on the opposite surface 31 of the lens 3 made of these glasses, joining strength can be improved by the sequential plasma method. The joining film 5 formed on the opposite surface 31 of the lens 3 is also referred to as the second joining film 5 below.

Moreover, when the lens 3 is quartz glass or quartz, a silicon oxide film as the second joining film 5 is not required. In this case, by reforming the opposite surface 31 of the lens 3 using the sequential plasma method, higher joining strength, compared to the case of reforming using only oxygen RIE, can be obtained.

Each silicon oxide film is formed by, for example, sputtering. The sputtering may be reactive sputtering. In reactive sputtering, a metal target and a mixed gas of an inactive gas, such as a noble gas, and a reactive gas (e.g., oxygen gas) is used to form a metal oxide on a targeted substrate. In sputtering, a metal oxide target may be used.

Moreover, each silicon oxide film forming method is not limited to sputtering, and plasma CVD (Chemical Vapor Deposition), vapor deposition, ALD (Atomic Layer Deposition) etc. may be applied.

Thickness of each silicon oxide film is, for example, 1-100 nm. When the thickness of each silicon oxide film is 1 nm or more, reforming by sequential plasm method is effective. When the thickness of each silicon oxide film is 100 nm or less, since total thickness of the two silicon oxide films is thinner than a wavelength of the light-emitting element 2, there is little reflection of light generated by a difference between refractive indices of the substrate 22 and the silicon oxide films.

Thickness of each silicon oxide film is preferably 75 nm or less, more preferably 50 nm or less, further preferably 30 nm or less, still further preferably 20 nm or less, particularly preferably 10 nm or less, and more particularly preferably 5 nm or less. Since each silicon oxide film is thin, the surface roughness of each silicon oxide film is approximately the same as the surface roughness of the light emission surface 21 of the light-emitting element 2, or approximately the same as the surface roughness of the opposite surface 31 of the lens 3.

A method of joining the light-emitting element 2 and the lens 3 is not limited to a surface-activated bonding technique. An atomic diffusion bonding process may be used. In an atomic diffusion bonding process, metal films are used for joining films 4, 5, but oxide films may also be used. Moreover, a method of joining the light-emitting element 2 and the lens 3 may also be a method using an organic adhesive. The organic adhesive may be applied to the light-emitting element 2, or the lens 3. A resin film made of a hardened organic adhesive is formed as a joining film. The organic adhesive may be a general one, but in order to avoid deterioration of the resin by the light of the light-emitting element 2, the organic adhesive is preferably a high ultraviolet resistant resin, specifically a silicone resin or a fluororesin. The organic adhesive may include only one resin, or a plurality of resins.

A silicone resin has a siloxane bond (Si—O—Si bond) main skeleton, which is a skeleton of silicon and oxygen connected alternately, and organic functional groups are connected to the silicon atoms. As an organic functional group, a functional group without absorption in the deep ultraviolet region, for example an alkyl group, is preferable. Some or all of hydrogen atoms of the alkyl group may be substituted for halogen atoms such as fluorine atoms or chlorine atoms.

A structure of the main skeleton may be a straight-chain structure referred to as ($—R^1R^2SiO—$), but silsesquioxane resin, referred to as ($—R^3SiO_{1.5}—$), is particularly preferably applied. In the formulae, $R^1$-$R^3$ are referred to as organic functional groups.

Silsesquioxane resin, having a structure of one organic functional group and three oxygen atoms connected to a silicon atom, having less organic functional groups than a straight-chain structure, has particularly good light-resistance and heat-resistance. As skeletons of a silsesquioxane resin, a random structure, a ladder structure, and a cage structure are known, and in the present embodiment, each of them can be used without restriction. As a silsesquioxane resin, SR series, SP series, and SO series, produced by Konishi Chemical Ind. Co., Ltd., are exemplified. Moreover, Silicone Resin KR-220L, KR-220KP, KR-242A and KR-251, produced by Shin-Etsu Chemical Co., Ltd., and a material disclosed in Japanese Patent No. 6257446 are also exemplified.

Silicone resin can include at least one metallic element X selected from a group consisting of titanium, zirconium, aluminum, tin, lanthanum, yttrium, gadolinium, cerium, iron, manganese, zinc, bismuth, cobalt, and nickel. A method of applying a metallic element X to the silicone resin may be a conventional method, but a method of applying an organic metal compound such as metalalkoxide, metal chelate, and metal acylate, and then heating to remove the organic compound of the organic metal compound by volatilization.

By applying a metallic element X, ultraviolet resistance of the silicone resin can be highly improved. Although the mechanism why the effect above is available is not known, a mechanism in which parts of the silicone resin which h are resolved by ultraviolet are bridged by the metallic element X can be supposed. In order to improve the ultraviolet resistance of the resin, it is preferable to apply at least one of aluminum, zinc, manganese, cobalt, and nickel, as the metallic element X.

If the content of the metallic element X is too low, an effect to improve the ultraviolet resistance is not sufficient; therefore, the content of the metallic element X is, for example, 0.01 mass % or more, preferably 0.02 mass % or more, more preferably 0.04 mass % or more, and further preferably 0.08 mass % or more.

If the content of the metallic element X is too high, a loss of light by light absorption of the metal component while the light from the light-emitting element 2 passes through the resin film becomes higher, therefore, the content of the metallic element X is, for example, 10 mass % or less, preferably 5 mass % or less, more preferably 1 mass % or less, and further preferably less than 1 mass %.

The content of the metallic element X (unit: mass %) is a percentage of the metallic element X when the mass of the silicone resin film (including the mass of the metallic element X) is 100 mass %. When a plurality of the metallic elements X is included, the content of each of the elements may be within the range above. For example, when the silicone resin includes X1 and X2 as the metallic element X, the content of X1 may be within the range above, and the content of X2 may also be within the range above.

The silicone resin film may include other metallic elements besides the metallic element X. Forms of the metallic element X and other metallic elements may be any form within metal, ion, oxide, compound, and complex.

A measuring method of the content of the metallic element X or other metallic elements in the silicone resin film is not restricted, and conventional methods, for example ICP atomic emission spectroscopy (ICP-AES), ICP mass spectrometry (ICP-MS), etc., can be adopted.

As a fluorine resin, an amorphous fluorine resin is preferably used. As an amorphous fluorine resin, for example, CYTOP (registered trademark), produced by AGC Inc., Teflon (registered trademark) AF, produced by Chemours-Mitsui Fluoroproducts Co., Ltd., etc. can be used. These amorphous fluorine resins are transparent, have no absorption in an ultraviolet region, a loss of light by light absorption of the metal component while the light from the light-emitting element 2 passes through the resin film is low, and ultraviolet resistance is high.

Note that, the light-emitting element 2 and the lens 3 are joined, as the light emission surface 21 of the light-emitting element 2 is opposite to the opposite surface 31 of the lens 3.

As shown in FIG. 3, the light emission surface 21 of the light-emitting element 2 is rectangular. In the present embodiment, the lengths of all four sides of the light emission surface 21 are equal, but one pair of sides may be longer than the other pair of sides. Seen from the direction perpendicular to the light emission surface 21, the circumferential edge of the convex surface 32 is circular.

As shown in FIG. 3, seen from the direction perpendicular to the light emission surface 21, when the distance between the center 32C of the convex surface 32, and the center 21C of the light emission surface 21 is referred to as Δ (unit: μm), a length of a shortest edge of the light emission surface is referred to as L (unit: mm), a diameter of the circumferential edge of the convex surface 32 is referred to as R (unit: mm), and R/L is referred to as r, the following formula (1) is satisfied.

$$0 < \Delta \leq 450/r \quad (1)$$

The center 32C of the convex surface 32 is, seen from the direction perpendicular to the light emission surface 21, a center of a circle of which the circumferential edge of the convex surface 32 is approximated by the least squares method. The center 21C of the light emission surface 21 is an intersection point of two diagonal lines between each pair of opposite angles of the light emission surface 21. L is preferably 0.5-3 mm, R is preferably 0.5-10 mm, and the ratio r (r=R/L) is preferably 1-10.

As is clear from the formula (1) above, the distance Δ is larger than 0 μm. Manufacturing the light-emitting device 1 in order for the distance Δ to be 0 μm leads to reduced yields and greater manufacturing costs. According to the present embodiment, since the distance Δ is larger than 0 μm, it is possible to prevent reduction of yield. The distance Δ is, preferably 0.1 μm or more, more preferably 1 μm or more.

Figure 4:
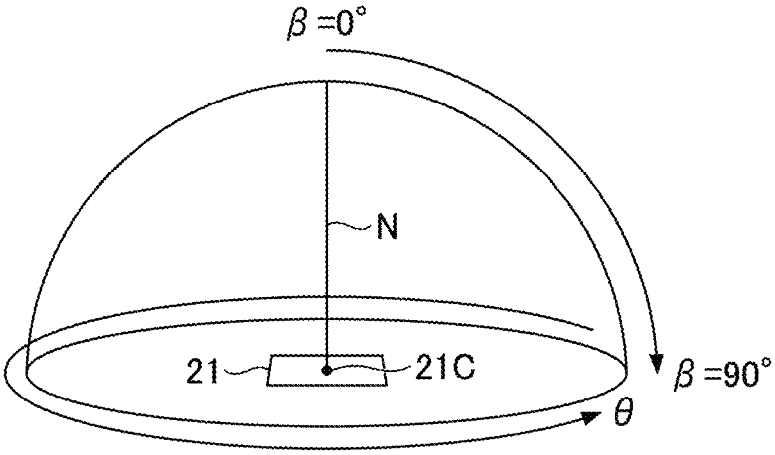
FIG. 4 is a perspective view illustrating one example of an angle of radiation and an angle of direction.

Next, referring to FIG. 4-8, a technical meaning of the distance Δ being 450/r or less is described. First, referring to FIG. 4, one example of an angle of radiation β and an angle of direction θ is described. In FIG. 4, the lens 3 is not shown. The angle of radiation β is an angle made between a normal N to the center 21C of the light emission surface 21 and a light ray. The angle of radiation β is 0-90°. The angle of direction θ is, seen from the direction perpendicular to the light emission surface 21, an angle made between a reference line and a light ray. The angle of direction is 0-360°.

Figure 5:
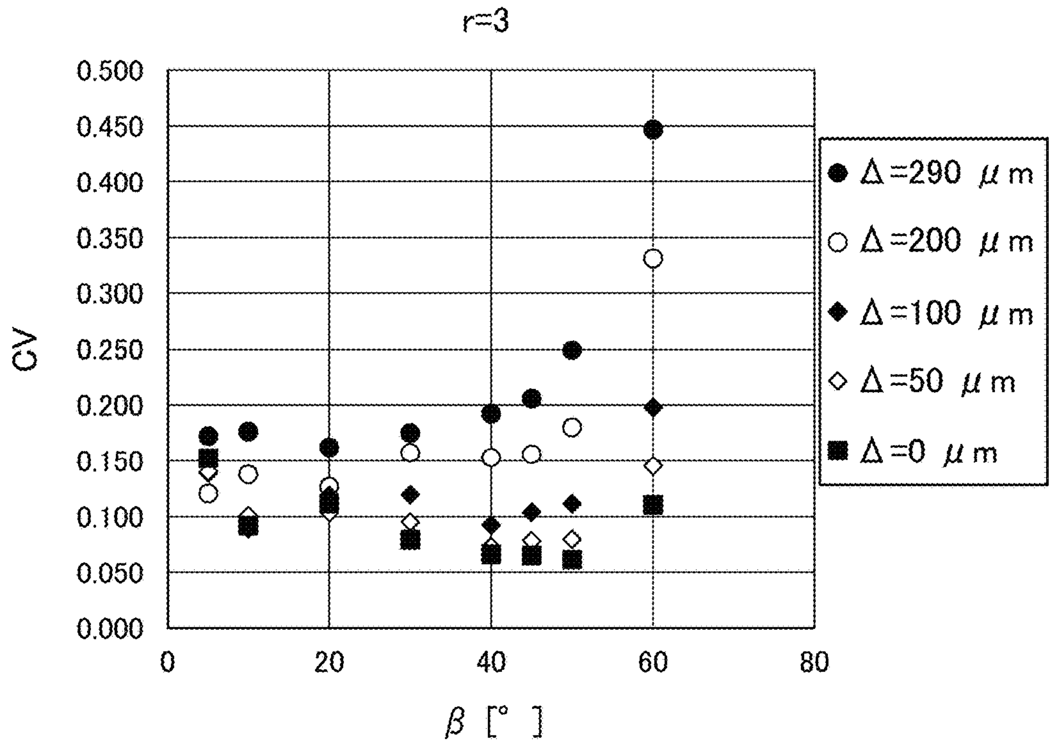
FIG. 5 is a drawing illustrating one example of a relationship between β, CV, and Δ, when r is 3.

Next, referring to FIG. 5, one example of the relationship between β, CV, and Δ, when r is 3, is described. FIG. 5 is a result when L is 1 mm and R is 3 mm. In FIG. 5, CV refers to a coefficient of variation when the angle of radiation β is kept constant and the angle of direction θ is changed.

A radiant intensity is a radiant intensity (unit: W/sr) of the light emitted from the convex surface 32 of the lens 3. A coefficient of variation is a value of a standard deviation divided by an average, and means a variation of data. The larger a coefficient of variation of a radiant intensity is, the larger is a deviation of a radiant intensity variation. According to FIG. 5, the larger the distance Δ is, the larger is the coefficient of variation CV, and the larger is the deviation of the radiant intensity variation.

A radiant intensity is found by an optical simulation, more specifically, by a ray tracing method. A light-emitting element used for the optical simulation includes a contact layer, light-emitting layer, and a sapphire substrate in this order. Material of the contact layer is p-GaN, which absorbs ultraviolet. Material of the light-emitting layer is an AlGaN semiconductor material whose refractive index is about 2.5. Light emitted from the light-emitting layer enters into the lens 3 through the sapphire substrate. Table 1 shows the condition of analysis of the optical simulation.

TABLE 1

| | | |
|---|---|---|
| Ray | Wavelength [nm] | 275 |
| | Strength [W] | 1 |
| | Dispersion | Isotropic Radial Dispersion |
| Light-Emitting Element | Substrate | Sapphire Substrate |
| | Total Thickness [μm] | 400 |
| | Light-Emitting Layer Thickness [μm] | 5 |
| | Shape of Light Emission Surface | Square |
| Lens | Shape of Convex Surface | Hemisphere |
| | Material | Glass A |
| 1st Joining Film | Material | $SiO_2$ |
| | Thickness [nm] | 5 |
| 2nd Joining Film | Material | $SiO_2$ |
| | Thickness [nm] | 5 |

"Glass A" shown in Table 1 is lanthanum borate glass, or glass including 5.8% of $SiO_2$, 66.58% of $B_2O_3$, 19.3% of $La_2O_3$, and 8.3% of $Y_2O_3$. As shown in Table 1, when a first joining film 4 and a second joining film 5 are $SiO_2$ films, as total thickness of two $SiO_2$ films is smaller than a wavelength of the light of the light-emitting element 2, calculation is performed by optical interference calculation method, concerning an effect of optical interference in the joining films.

Moreover, as described later, when the joining films are silicone resin films, thickness of the silicone resin layer is larger than the wavelength of the light of the light-emitting element 2, and thus optical interference calculation is not performed.

Figure 6:
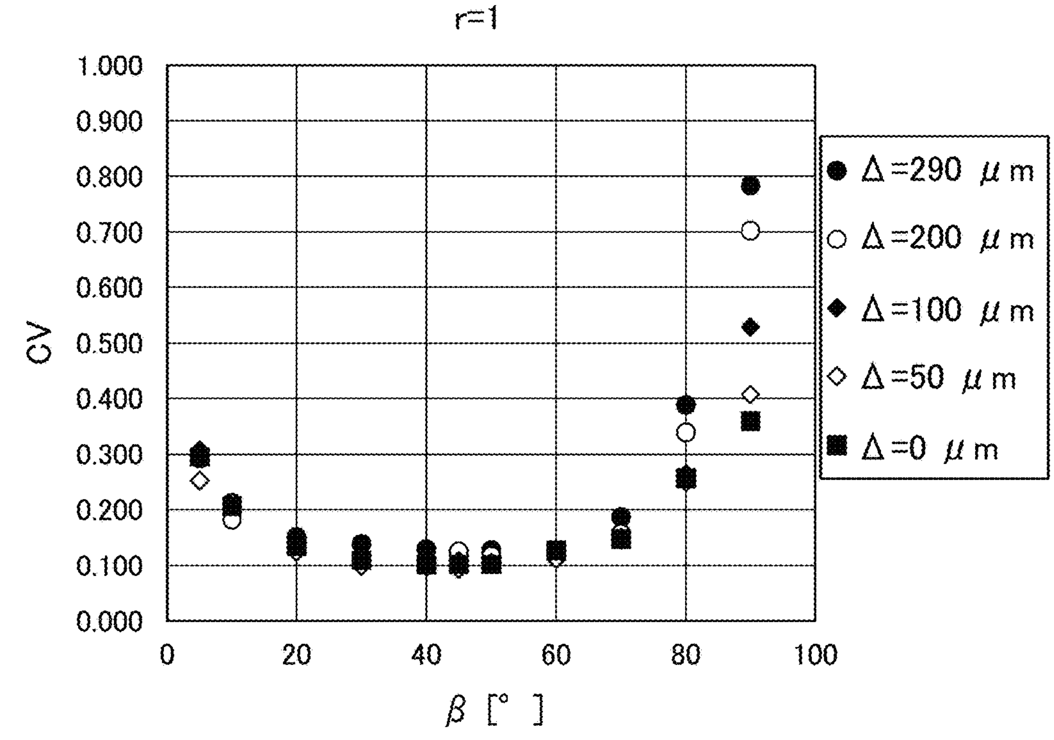
FIG. 6 is a drawing illustrating one example of a relationship between β, CV, and Δ, when r is 1.

Next, referring to FIG. 6, one example of the relationship between β, CV, and Δ, when r is 1, is described. FIG. 6 is a result when L is 1 mm and R is 1 mm. A condition of analysis of the optical simulation is same as in Table 1. According to FIG. 6, same as in FIG. 5, the larger the distance Δ is, the larger is the coefficient of variation CV, and the larger is the deviation of the radiant intensity variation.

An average of the coefficient of variation CV when the angle of radiation β is within a range of 10-50° is referred to as $CV_{AVE}$ below. The larger $CV_{AVE}$ is, the larger is the deviation of the radiant intensity variation. According to FIG. 5 and FIG. 6, $CV_{AVE}$ depends on the distance Δ and the ratio r. The effect of the distance Δ to $CV_{AVE}$ is referred to as $\Delta CV_{AVE}$.

$\Delta CV_{AVE}$ is found by the following formula (2).

$$\Delta CV_{AVE} = CV_{AVE}(\Delta \geq 0) - CV_{AVE}(\Delta = 0) \qquad (2)$$

Figure 7:
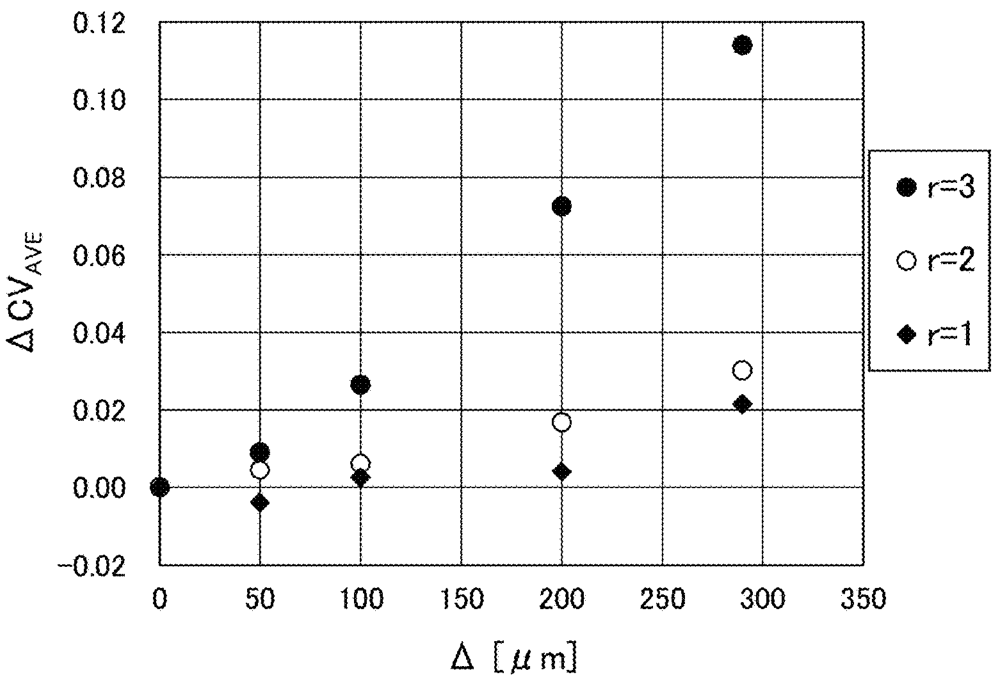
FIG. 7 is a drawing illustrating one example of a relationship between Δ, $\Delta CV_{AVE}$, and r.

Next, referring to FIG. 7, one example of the relationship between Δ, $\Delta CV_{AVE}$, and r is described. FIG. 7 is a result when L is 1 mm and R is 1 mm, 2 mm, or 3 mm. A condition of analysis of the optical simulation is same as in Table 1. According to FIG. 7, the larger the ratio r is, the larger is $\Delta CV_{AVE}$, and the larger is the deviation of the radiant intensity variation.

Figure 8:
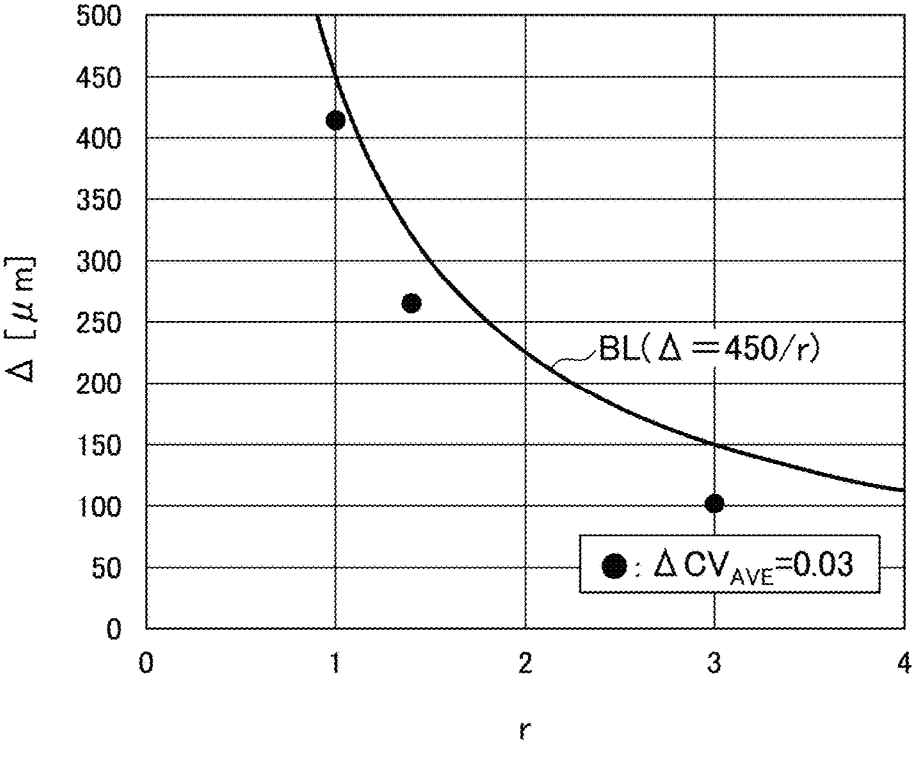
FIG. 8 is a drawing illustrating one example of a relationship between the formula (1) and $\Delta CV_{AVE}$.

Next, referring to FIG. 8, one example of the relationship between formula (1) and $\Delta CV_{AVE}$ is described. In FIG. 8, black circles show points where $\Delta CV_{AVE}$ is 0.03. Moreover, in FIG. 8, a borderline BL satisfies the following formula (3).

$$\Delta = 450/r \qquad (3)$$

As the borderline BL is a basis, a lower left region is the region in which the distance Δ is 450/r or less. According to FIG. 8, by limiting the distance Δ to 450/r or less, $\Delta CV_{AVE}$ can be limited to about 0.03 or less, and the deviation of the radiant intensity variation can be prevented.

Figure 9:
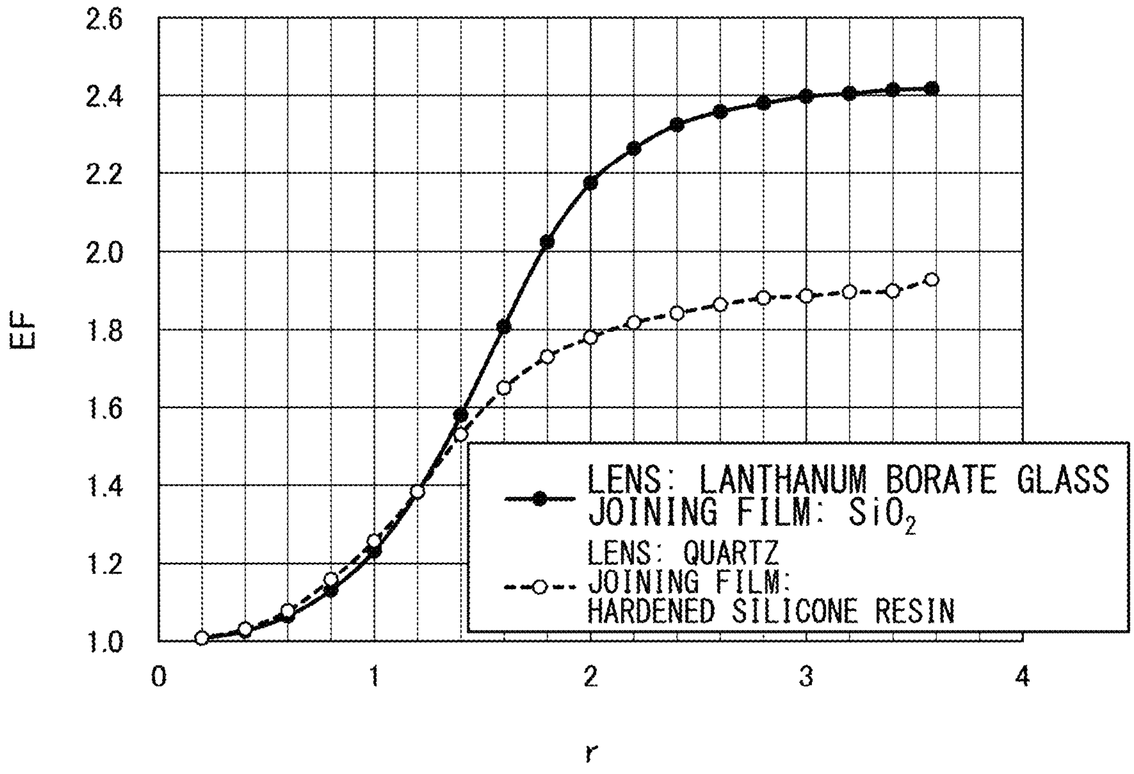
FIG. 9 is a drawing illustrating one example of a relationship between r and EF.

Next, referring to FIG. 9, one relationship between r and EF is described. In FIG. 9, EF is a ratio of strength of all rays emitted from the convex surface 32 of the lens 3 in a case the lens 3 is present, against a strength of all rays emitted from the light emission surface 21 of the light-emitting element 2 in a case the lens 3 is not present. The larger EF is, the more efficiently light is extracted.

In FIG. 9, a solid line is a value found by the optical simulation with the same condition of analysis as Table 1, and a broken line is a value found by the optical simulation with the same condition of analysis as Table 1, except for that the material of the lens is quartz (refractive index: 1.50), the material of the joining film is hardened silicone resin (refractive index: 1.47), and the total thickness of the joining films is 10 μm. Moreover, although the distance Δ is 0 μm in FIG. 9, the distance Δ may be larger than 0 μm.

According to FIG. 9, the larger the ratio r is, the larger is EF, and the more efficiently light is extracted. The ratio r is preferably 1.0 or more (R≥L), more preferably 20.5 or more (about 1.4 or more), and further preferably 2.0 or more, particularly preferably 2.5 or more.

Moreover, if the ratio r is 1 or more, when the light emission surface 21 of the light-emitting element 2 square, is the diameter of the circumferential edge of the convex surface 32 is same as or more than that of an incircle of the square. Moreover, if the ratio r is 20.5, when the light emission surface 21 of the light-emitting element 2 is square, the diameter of the circumferential edge of the convex surface 32 is same as or more than that of a circumcircle of the square.

If the lens 3 is too large, the lens 3 interferes with surrounding members. Therefore, the ratio r is preferably 10 or less.

The larger the ratio r is, the more efficiently light is extracted, however, when the ratio r is over 5, light-extracting efficiency is saturated. Therefore, the ratio r is preferably 5 or less.

Figure 10:
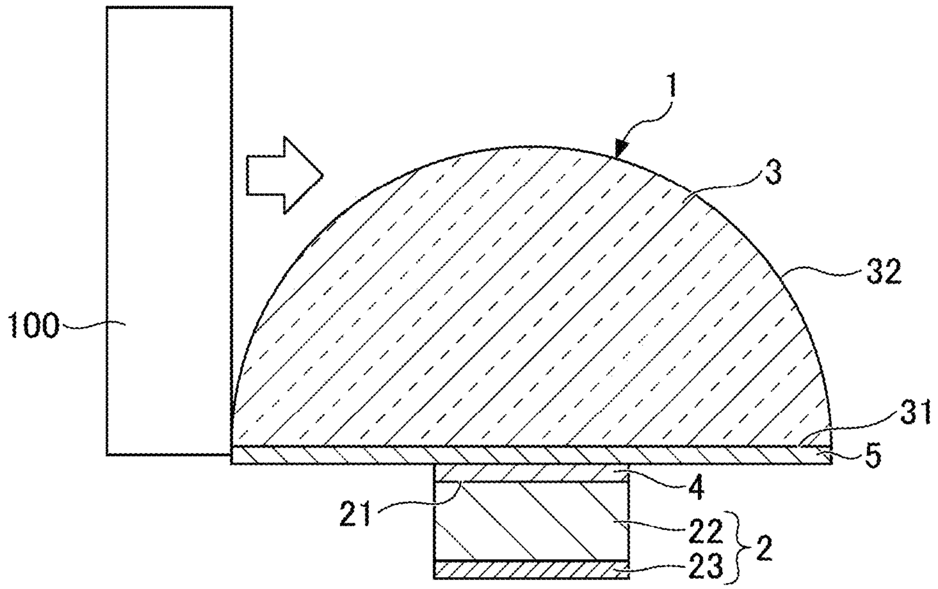
FIG. 10 is a drawing illustrating one example of a peel strength testing method.

Next, referring to FIG. 10, one example of peel strength testing methods is described. Peel strength is a load to peel the light-emitting element 2 from the lens 3, when shearing stress is applied to the light emission surface 21 and the opposite surface 31. The peel strength is measured, fixing the light-emitting element 2, by pushing the lens 3 horizontally with a rod 100 perpendicular to the light emission surface 21 and the opposite surface 31.

The peel strength is preferably 0.1 kgf or more. If the peel strength is 0.1 kgf or more, it is possible to prevent for the light-emitting element 2 and the lens 3 to separate by vibration or shock while the light-emitting device 1 is used. The peel strength is more preferably 0.2 kgf or more, further preferably 0.5 kgf or more, and particularly preferably 1 kgf or more.

From the perspective of productivity, the peel strength is preferably 10 kgf or less.

Although not shown, the light-emitting device 1 may include an anti-reflection coating on the convex surface 32 of the lens 3. The anti-reflection coating prevents the light from inside to outside of the lens 3 to be reflected to the inside of the lens 3, and improves light-extracting efficiency.

Although not shown, the convex surface 32 of the lens 3 may include an uneven structure to prevent reflection of the light emitted by the light-emitting element 2. The uneven structure of the convex surface 32 has, for example a moth-eye structure, prevents the light from inside to outside of the lens 3 to be reflected to the inside of the lens 3, and improves light-extracting efficiency.

Although not shown, the convex surface 32 of the lens 3 may include an uneven structure to disperse the light emitted from the light-emitting element 2. The uneven structure on the convex surface 32 emits the light to a wider range by dispersing the light emitted from the convex surface 32.

Figure 11:
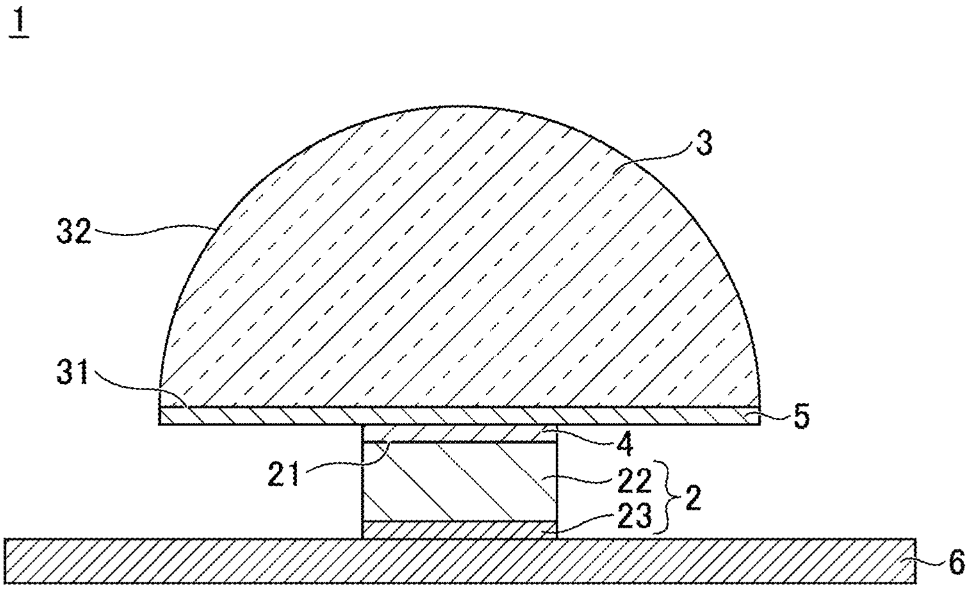
FIG. 11 is a cross section of a light-emitting device related to the first variation.
Figure 12:
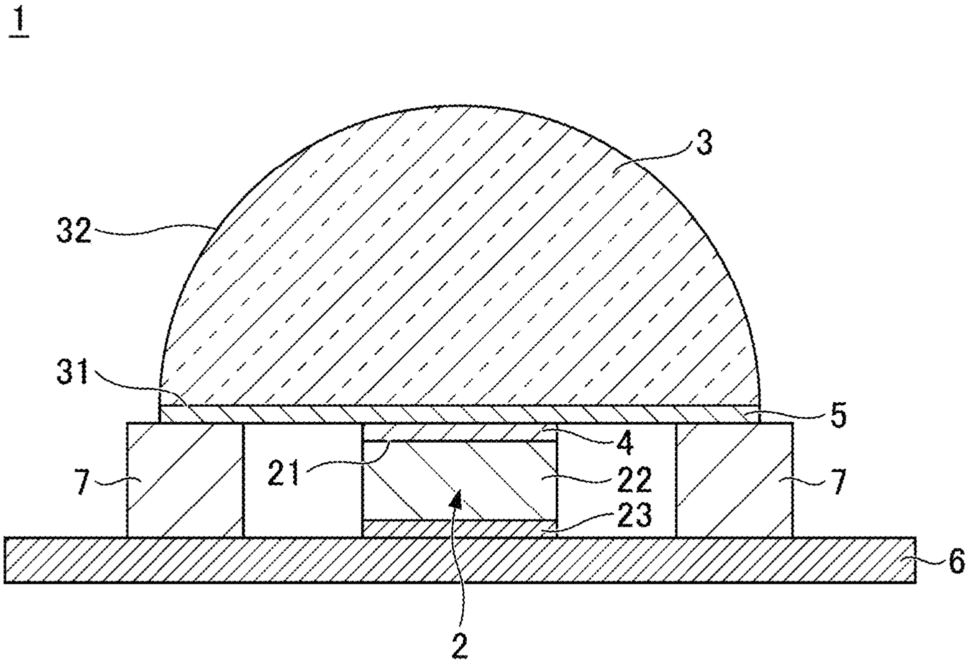
FIG. 12 is a cross section of a light-emitting device related to the second variation.
Figure 16:
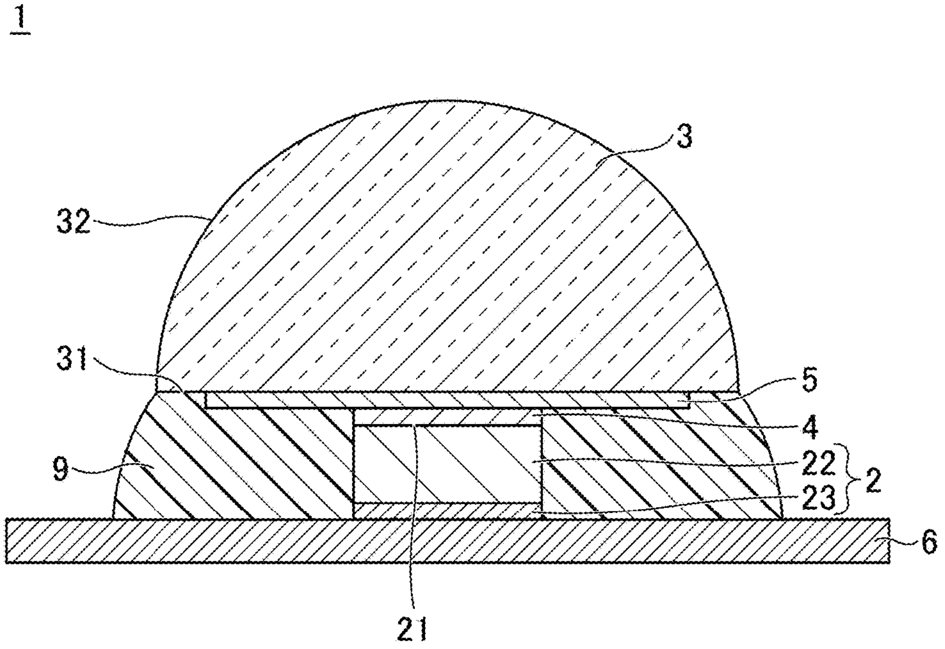
FIG. 16 is a cross section of a light-emitting device related to the sixth variation.

As shown in FIG. 11, FIG. 12, and FIG. 16, the light-emitting device 1 may include an installed substrate 6 to which the light-emitting element 2 is joined through a not shown solder bump. As shown in FIG. 12, the light-emitting device 1 may include a frame 7 surrounding the light-emitting element 2. The light-emitting element 2 and the frame 7 are joined through the joining film 5, but they may be joined through an adhesive different from the joining film 5. The lens 3 is joined to the installed substrate 6 through the frame 7. By using the frame 7, the joining strength of the lens 3 and the installed substrate 6 can be improved. Moreover, by using the frame 7, penetration of water or oxygen from outside to the light-emitting element 2 can be prevented, and deterioration of performance of the light-emitting element 2 can be prevented. As shown in FIG. 16, the light-emitting device 1 may include a sealing resin 9 surrounding the light-emitting element 2 and the joining films 4, 5. The sealing resin 9 prevents water or oxygen of the outer atmosphere to contact to the light-emitting element 2 or the joining film 4, 5, and can prevent deterioration of performance of the light-emitting element 2 or the joining films 4, 5. Moreover, the sealing resin 9 can improve the joining strength of the lens 3 and the installed substrate 6.

The material of the sealing resin 9 is, from the perspective of ultraviolet resistance and gas barrier property, preferably silicone resin, fluororesin, or epoxy resin.

Figure 13:
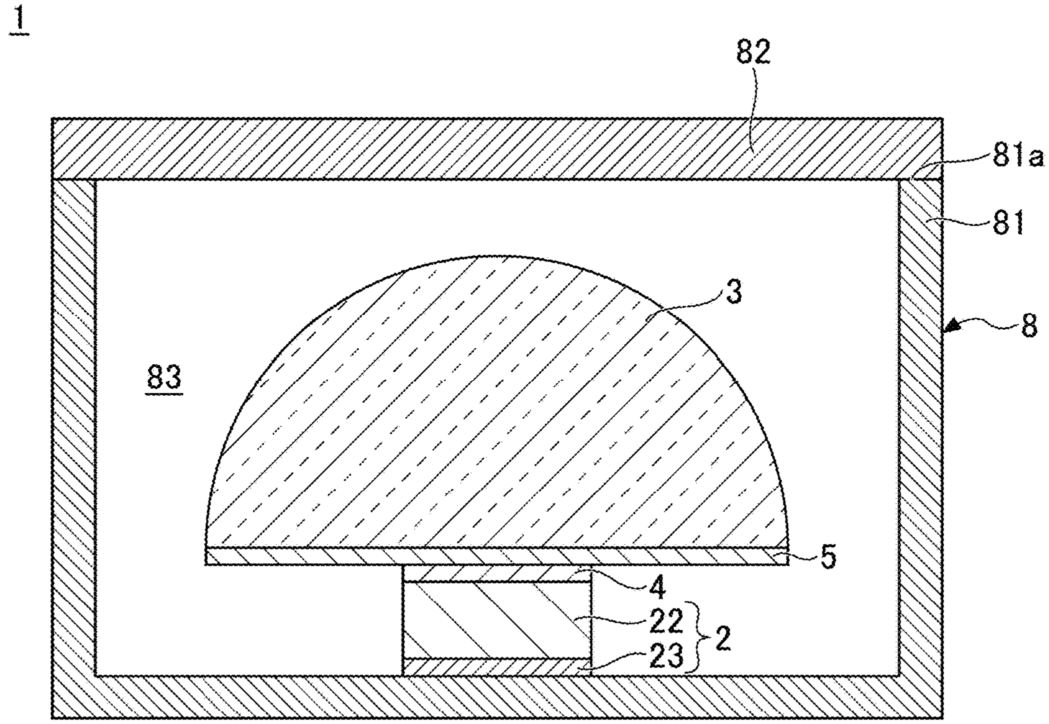
FIG. 13 is a cross section of a light-emitting device related to the third variation.
Figure 14:
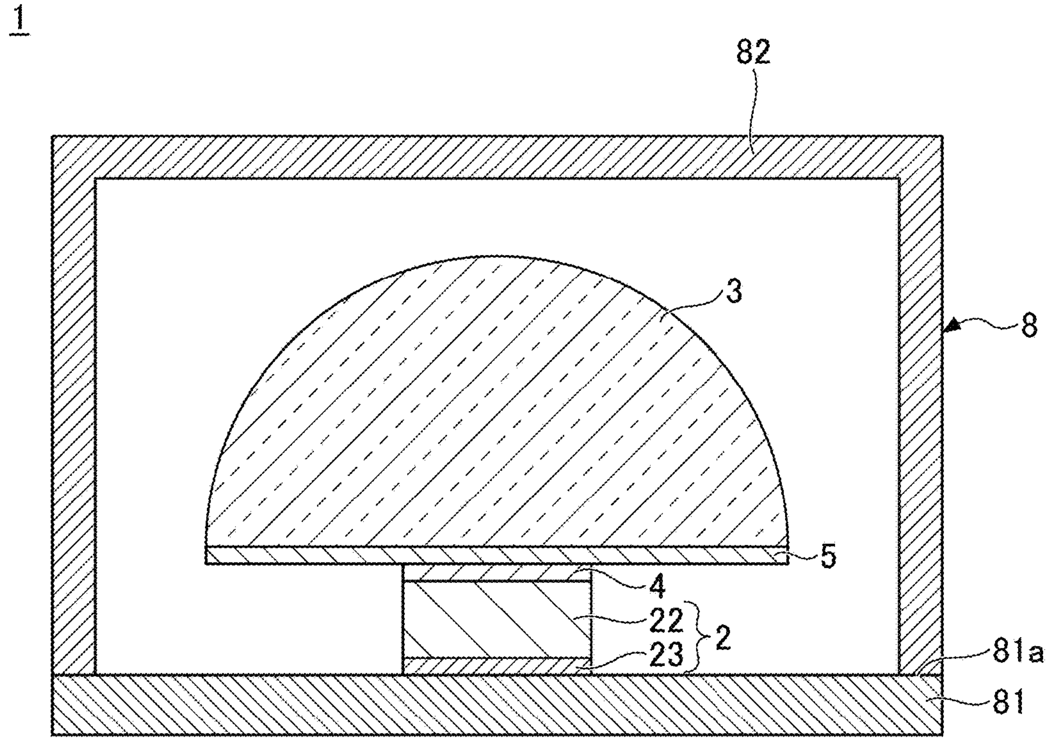
FIG. 14 is a cross section of a light-emitting device related to the fourth variation.
Figure 15:
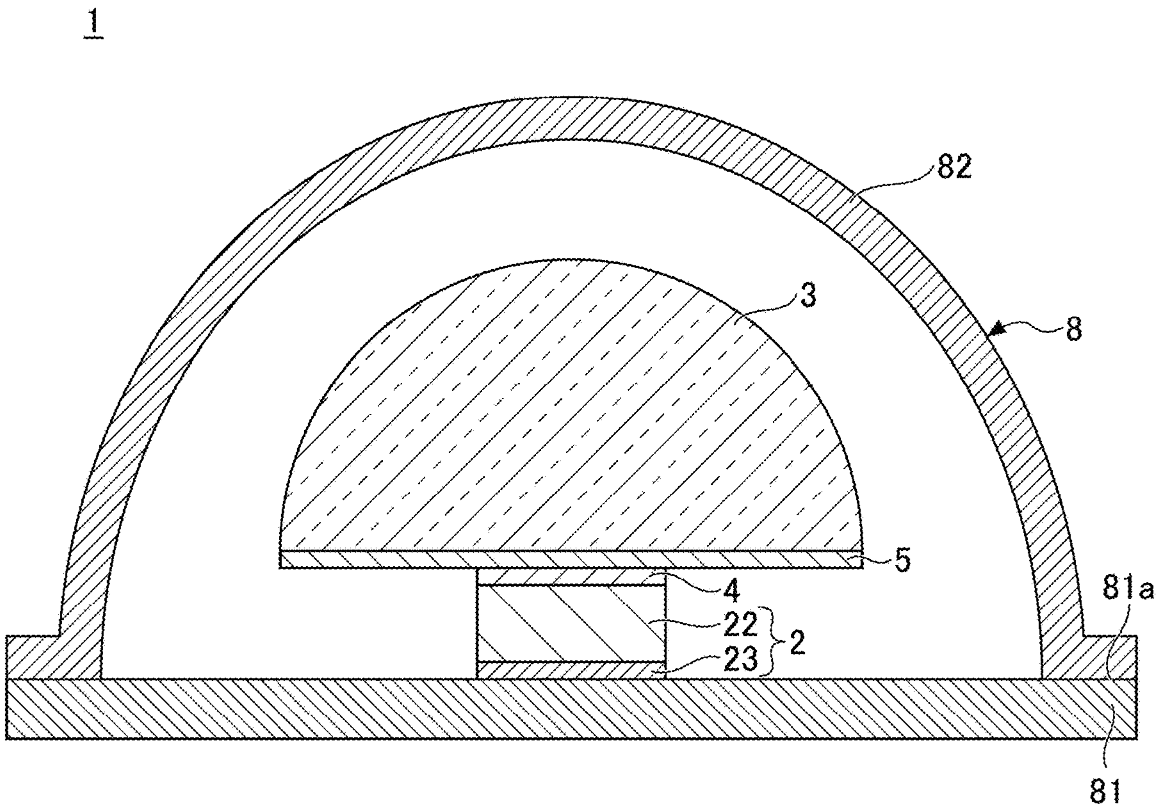
FIG. 15 is a cross section of a light-emitting device related to the fifth variation.

As shown in FIG. 13-FIG. 15, the light-emitting device 1 may include a container 8 to hold the light-emitting element 2 and the lens 3. The container 8 includes, for example, as shown in FIG. 13, an installed substrate 81 and a cover 82. On the surface 81*a* of the substrate 81, a concave portion 83 is formed. The light-emitting element 2 is fixed on an inner bottom surface of the concave portion 83.

The light-emitting element 2 is fixed by a conventional method such as die bonding. After the light-emitting element 2 has been fixed to the installed substrate 81, the light-emitting element 2 and the lens 3 are joined. An order may be reversed: after the light-emitting element 2 and the lens 3 have been joined, the light-emitting element 2 may be fixed to the installed substrate 81.

The cover 82 is, for example, planar, and adhered to the surface 81*a* of the substrate 81. The cover 82 is formed from material transmitting the light emitted from the light-emitting element 2, for example, quartz or inorganic glass. The cover 82 and the substrate 81 are adhered with metallic solder, inorganic adhesive, or organic adhesive. Consequently, penetration of water or oxygen from outside to the light-emitting element 2 can be prevented, and deterioration of performance of the light-emitting element 2 can be prevented.

As shown in FIG. 13, the cover 82 is planar, but it may be box-shaped as in FIG. 14, or dome-shaped as shown in FIG. 15. When the cover 82 is box-shaped or dome-shaped, the light emitted radially from the lens 3 can be extracted efficiently to outside. When it is dome-shaped, the light is extracted particularly efficiently. Moreover, when the cover 82 is box-shaped or dome-shaped, since the concave portion 83 is not formed on the surface 81*a* of the substrate 81, cost of the substrate 81 can be reduced.

EXAMPLES

[EXAMPLE 1] In example 1, a light-emitting device was manufactured by joining a hemispherical lens made of glass A ($SiO_2$: 5.8 mol %, $B_2O_3$: 66.58 mol %, $La_2O_3$: 19.3 mol %, $Y_2O_3$: 8.3 mol %) and a light-emitting element by a sequential plasma method.

As a light-emitting element, one with 275 nm of peak wavelength and a light emission surface made of a sapphire substrate was prepared. The light-emitting element was flip chip mounted to an installed substrate made of an aluminum nitride sintered body.

An $SiO_2$ film was formed on a joining surface of the hemispheric lens and a joining surface of the light-emitting element by reactive sputtering. The surface of the $SiO_2$ film was reformed by the sequential plasma method. Concretely, after an oxygen RIE, a nitrogen RIE, and radiation of nitrogen radicals were performed in this order, OH groups were formed on the reformed surface by exposing the film to the atmosphere. The oxygen RIE process lasted for 180 seconds, the nitrogen RIE process lasted for 180 seconds, and the nitrogen radical radiation lasted for 15 seconds.

A light-emitting device was manufactured by adhering the lens and the light-emitting element by causing surface-reformed $SiO_2$ films to face each other, and to heat them to 200 °C for 2 hours. The lens and the light-emitting element could be strongly joined by the sequential plasma method. Peel strength of the joining surface of the hemispherical lens and the light-emitting element was 1.7 kgf. Peel strength was measured by DAGE4000plus (produced by Nordson Corporation).

[EXAMPLE 2] In example 2, a light-emitting device was manufactured, by joining a lens and a light-emitting element under the same condition as example 1, except for that a hemispheric lens made of glass B ($SiO_2$: 100 mol %) was prepared instead of a hemispheric lens made of glass A, and a $SiO_2$ film was not formed on a joining surface of the hemispheric lens, and then, heating them to 200 °C for 2 hours. When the hemispheric lens was made of quartz glass, it was strongly joined by using the sequential plasma method without forming $SiO_2$ film on the joining surface of the quartz glass.

[EXAMPLE 3] In example 3, a light-emitting device was manufactured by joining a hemispherical lens made of glass A, and a light-emitting element with organic adhesive. As a light-emitting element, one with 275 nm of peak wavelength and a light emission surface made of a sapphire substrate was prepared. The light-emitting element was flip chip mounted to an installed substrate made of an aluminum nitride sintered body before joining to the hemispherical lens.

As an organic adhesive, polysilsesquioxane (produced by Konishi Chemical Ind. Co., Ltd., SR-13, solid content concentration 70 mass %, solvent: butyl acetate) was used. A resin film was formed by applying the organic adhesive to the joining surface of the lens, drying at 50 °C for 60 minutes, and drying at 80 °C for 20 minutes. Thickness of the resin film was 20 μm.

Subsequently, the lens was put on the light-emitting element through the resin film, and the resin film was softened by heating on a hot plate at 100 °C for 30 minutes, and expanded on the whole of the joining surface of the light-emitting element. Subsequently, the resin film was hardened by heating at 200 °C for 30 minutes. By this means, the lens and the light-emitting element were strongly joined.

[EXAMPLE 4] In example 4, a lens and a light-emitting element were adhered under the same condition as example 3, except that a hemispheric lens made of glass B was prepared, instead of a hemispheric lens made of glass A. By this means, the lens and the light-emitting element were strongly joined.

[EXAMPLE 5] In example 5, a light-emitting device was manufactured by joining a hemispherical lens made of glass A, and a light-emitting element with organic adhesive. As a light-emitting element, one with 275 nm of peak wavelength and a light emission surface made of a sapphire substrate was prepared. The light-emitting element was flip chip mounted to an installed substrate made of an aluminum nitride sintered body before joining to the hemispherical lens.

The organic adhesive was made by a following process. Triethoxymethylsilane (179 g), toluene (300 g), and acetic acid (5 g) were put into a 1 L flask, the mixture was stirred at 25 °C for 20 minutes, then heated to 50 °C and reacted for 12 hours. The obtained reaction crude liquid was cooled to 25 °C, and purified 3 times with water (300 g). Chlorotrimethylsilane (70 g) was added to the purified reaction crude liquid, the mixture was stirred at 25 °C for 20 minutes, and then heated to 60 °C and reacted for 12 hours. The obtained reaction crude liquid was cooled to 25 °C, and purified 3 times with water (300 g). The obtained reaction crude liquid was slurried by distilling off the toluene under reduced pressure, dried in a vacuum dryer for a whole night, and then white organopolysiloxane compound was obtained.

A resin film was formed by applying the white organopolysiloxane compound to the joining surface of the lens as an organic adhesive, drying at 100 °C for 10 minutes, then drying at 250 °C for 30 minutes. Next, the lens was on the light-emitting element through the resin film, the resin film was softened by heating on a hot plate at 100 °C for 30 minutes, and expanded on the whole of the joining surface of the light-emitting element. Subsequently, the resin film was hardened by heating at 200 °C for 30 minutes. By this means, the lens and the light-emitting element were strongly joined.

[EXAMPLE 6] In example 6, a lens and a light-emitting element were adhered under the same condition as example 5, except that a hemispheric lens made of glass B was prepared, instead of a hemispheric lens made of glass A. By this means, the lens and the light-emitting element were strongly joined.

[EXAMPLE 7] In example 7, a light-emitting device was manufactured by joining a hemispherical lens made of glass A, and a light-emitting element with organic adhesive. As a light-emitting element, one with 275 nm of peak wavelength and a light emission surface made of a sapphire substrate was prepared. The light-emitting element was flip chip mounted to an installed substrate made of an aluminum nitride sintered body before joining to the hemispherical lens.

The organic adhesive was manufactured by mixing the white organopolysiloxane compound (30 g) obtained in example 5, zirconiumtetra-n-butoxide ("Orgatix ZA-65", produced by Matsumoto Fine Chemical Co., Ltd., metal content of 20.3%) (0.13 g) as a metallic compound, and Isoper G (produced by TonenGeneral Sekiyu K. K.) (30 g), filtering the obtained mixture with a filter with 0.45 μm diameter holes.

A resin film was formed by applying the organic adhesive to the joining surface of the lens, drying at 100 °C for 10 minutes, and then drying at 250 °C for 30 minutes. Subsequently, the lens was on the light-emitting element through the resin film, the resin film was softened by heating on a hot plate at 100 °C for 30 minutes, and expanded on the whole of the joining surface of the light-emitting element. Subsequently, the resin film was hardened by heating at 200 °C for 30 minutes. By this means, the lens and the light-emitting element were strongly joined. Peel strength of the joining surface of the hemispherical lens and the light-emitting element was 1.7 kgf. Peel strength was measured by DAGE4000plus (produced by Nordson Corporation).

[EXAMPLE 8] In example 8, a lens and a light-emitting element were adhered under the same conditions as in example 5, except that a hemispheric lens made of glass B was prepared, instead of a hemispheric lens made of glass A. By this means, the lens and the light-emitting element were strongly joined.

[Ultraviolet Resistance Evaluation of Organic Adhesives G1-G11]

Ultraviolet resistance of organic adhesives was evaluated by manufacturing quartz laminated substrates which were made of two quartz substrates adhered with organic adhesives G1-G11 shown in table 2, 3 or 4, putting the quartz laminated substrates on an ultraviolet emitting element, lighting the ultraviolet emitting element, and irradiating the quartz laminated substrates with ultraviolet. As the ultraviolet emitting element, one with 265 nm of emitting wavelength and 40 mW of radiant flux was used. After irradiating the quartz laminated substrates with ultraviolet for 100 hours, whether the ultraviolet irradiation caused deterioration such as stains or cracks was observed. The result of the observation is shown in Tables 2, 3, and 4.

TABLE 2

| Organic Adhesive | | G1 | G2 | G3 | G4 | G5 |
|---|---|---|---|---|---|---|
| Composition | Metallic Compound | Tetra-n-butoxyzirconium | Aluminum (III) acetyl acetonate | Aluminum (III) acetyl acetonate | Cerium (III) 2-ethylhexanoate | Tris iron (III) (2-ethylhexanoate) |
| | Metallic Element X | Zr | Al | Al | Ce | Fe |
| | Amount of Metallic Element X [mass %] | 0.1 | 0.05 | 0.1 | 0.1 | 0.05 |
| Result of Observation | Stains | Yellow | No | No | Yellow | Yellow |
| | Cracks | No | No | No | No | No |

TABLE 3

| | | Organic Adhesive | | | |
|---|---|---|---|---|---|
| | | G6 | G7 | G8 | G9 |
| Composition | Metallic Compound | Bis zinc (2-ethylhexanate) | Tetra-n-butyltitanate | Manganese (II) 2-ethylhexanate | Bismuth (II) 2-ethylhexanate |
| | Metallic Element X | Zn | Ti | Mn | Bi |
| | Amount of Metallic Element X [mass %] | 0.1 | 0.1 | 0.1 | 0.1 |
| Result of Observation | Stains | No | Yellow | No | Yellow |
| | Cracks | No | No | No | No |

TABLE 4

| | | Organic Adhesive | |
|---|---|---|---|
| | | G10 | G11 |
| Composition | Metallic Compound | Cobalt 2-ethylhexanate | Nickel 2-ethylhexanate |
| | Metallic Element X | Co | Ni |
| | Amount of Metallic Element X [mass %] | 0.1 | 0.1 |
| Result of Observation | Stains | No | No |
| | Cracks | No | No |

The organic adhesives G1-G11 were made by a following process. Triethoxymethylsilane (179 g), toluene (300 g), and acetic acid (5 g) were put into a 1 L flask, the mixture was stirred at 25 °C for 20 minutes, and then heated to 60 °C and reacted for 12 hours. The obtained reaction crude liquid was cooled to 25 °C, and purified 3 times with water (300 g). The obtained reaction crude liquid was slurried by distilling off the toluene under reduced pressure, dried in a vacuum dryer for a whole night, and then white organopolysiloxane compound (resin C) was obtained. Adhesive solutions of each adhesive G1-G11 were made by mixing the resin C, metallic compounds, and toluene, and filtering the obtained mixture by a filter with 0.45 μm holes. The metallic compounds were mixed with the resin C in order for the amount (mass %) of metallic elements X to be the values shown in table 2, 3, or 4. Moreover, the amount (mass %) of metallic elements X shown in Tables 2, 3, and 4 is a value based on the amount of the resin C (100 mass %).

Adhesive layers were formed by applying adhesive solutions of each adhesive G1-G11 to a 0.5 mm thick quartz substrate by spin coating, drying at 100 °C for 10 minutes, and drying at 250 °C for 30 minutes. Subsequently, a quartz laminated substrate was manufactured by putting a 0.5 mm thick quartz substrate on an adhesive layer of another quartz substrate, and heating to 200 °C for 30 minutes in an oven. Two quartz substrates were strongly joined through the adhesive layer.

The quartz laminated substrates were irradiated with ultraviolet by fixing each quartz substrate on the ultraviolet emitting laminated element and lighting the ultraviolet emitting element for 100 hours. As shown in Tables 2, 3, or 4, the organic adhesives G2, G3, G6, G8, G10, and G11, applied aluminum, zinc, manganese, cobalt, or nickel as metallic element X, are not stained after ultraviolet irradiation, and have high ultraviolet resistance. There organic adhesives G2, G3, G6, G8, G10, and G11 are preferably used to seal light-emitting elements or to adhere optical members such as lenses, prisms, or light-guiding plates. Moreover, by using as resin, these organic adhesives G2, G3, G6, G8, G10, and G11 are preferably used as material of resin products such as resin lenses or resin substrates.

Concerning embodiments above, the following additions are disclosed.

[ADDITION 1] A light-emitting device including:
- a light-emitting element; and
- a lens joined to the light-emitting element,
- wherein the light-emitting element has a rectangular light emission surface facing the lens,
- wherein the lens includes: an opposing surface facing the light-emitting element; and a convex surface oriented in an opposite direction to the opposing surface, and
- wherein as seen in a direction perpendicular to the light emission surface, a circumferential edge of the convex surface is circular, and, when a distance between a center of the convex surface and a center of the light emission surface is denoted by Δ (unit: μm); a length of a shortest edge of the light emission surface is denoted by L (unit: mm); a diameter of the circumferential edge of the convex surface is denoted by R (unit: mm); and R/L is denoted as r; formula (1):

$$0 < \Delta \leq 450/r \tag{1}$$

is satisfied.

[ADDITION 2] The light-emitting device according to addition 1:
- wherein Δ is 0.1 μm or more.

[ADDITION 3] The light-emitting device according to addition 1 or 2:
- wherein r is 1.0 or more.

[ADDITION 4] The light-emitting device according to addition 3:
- wherein r is 1.4 or more.

[ADDITION 5] The light-emitting device according to addition 4:
- wherein r is 2.0 or more.

[ADDITION 6] The light-emitting device according to addition 5:
- wherein r is 2.5 or more.

[ADDITION 7] The light-emitting device according to one of additions 1-6:
- wherein a load to peel the light-emitting element and the lens is 0.1 kgf or more, when a shearing stress is applied to the light emission surface and the opposite surface.

[ADDITION 8] The light-emitting device according to one of additions 1-7: including an anti-reflection coating on the convex surface of the lens.

[ADDITION 9] The light-emitting device according to one of additions 1-8:
- wherein the convex surface of the lens includes an uneven structure to prevent reflection of light emitted from the light-emitting element.

[ADDITION 10] The light-emitting device according to one of additions 1-8:
- wherein the convex surface of the lens includes an uneven structure to disperse light emitted from the light-emitting element.

[ADDITION 11] The light-emitting device according to one of additions 1-10: including a joining film between the light-emitting element and the lens.

[ADDITION 12] The light-emitting device according to one of additions 1-11:
- wherein the lens is an oxide glass.

[ADDITION 13] The light-emitting device according to one of additions 1-11:
- wherein the lens is quartz glass, quartz, or sapphire crystal.

Further, the present invention is not limited to these embodiments, but various variations and modifications may be made without departing from the scope of the present invention.

The present application is a continuation application of International Application No. PCT/JP2023/005794, filed Feb. 17, 2023 which claims priority to Japanese Patent Application No. 2022-032931 filed on Mar. 3, 2022 with the Japanese Patent Office, and Japanese patent Application No.

2022-184082 filed on Nov. 17, 2022 with the Japanese Patent Office, and the entire contents of No. 2022-032931 and No. 2022-184082 are hereby incorporated by reference.

What is claimed is:

1. A light-emitting device comprising:

a light-emitting element; and a lens joined to the light-emitting element, wherein the light-emitting element has a rectangular light emission surface facing the lens, wherein the lens includes: an opposing surface facing the light-emitting element; and a convex surface oriented in an opposite direction to the opposing surface, and wherein as seen in a direction perpendicular to the light emission surface, a circumferential edge of the convex surface is circular, and, when a distance between a center of the convex surface and a center of the light emission surface is denoted by Δ (unit: μm); a length of a shortest edge of the light emission surface is denoted by L (unit: mm); a diameter of the circumferential edge of the convex surface is denoted by R (unit: mm); and R/L is denoted as r; formula (1):

$$0 < \Delta \leq 450/r \quad (1)$$

is satisfied.

2. The light-emitting device according to claim 1, wherein Δ is 0.1 μm or more.

3. The light-emitting device according to claim 1, wherein r is 1.0 or more.

4. The light-emitting device according to claim 3, wherein r is 1.4 or more.

5. The light-emitting device according to claim 4, wherein r is 2.0 or more.

6. The light-emitting device according to claim 5, wherein r is 2.5 or more.

7. The light-emitting device according to claim 1, wherein a load to peel the light-emitting element from the lens is 0.1 kgf or more when a shearing stress is applied to the light emission surface and the opposing surface.

8. The light-emitting device according to claim 1, further comprising an anti-reflection coating on the convex surface of the lens.

9. The light-emitting device according to claim 1, wherein the convex surface of the lens has micro-textures to prevent reflection of light emitted from the light-emitting element.

10. The light-emitting device according to claim 1, wherein the convex surface of the lens has micro-textures to disperse light emitted from the light-emitting element.

11. The light-emitting device according to claim 1, further comprising a joining film between the light-emitting element and the lens.

12. The light-emitting device according to claim 1, wherein the lens is an oxide glass.

13. The light-emitting device according to claim 1, wherein the lens is quartz glass, quartz, or sapphire crystal.

14. The light-emitting device according to claim 1, wherein an average of a coefficient of variation CV of radiant intensity when an angle of radiation β is within a range of 10° to 50° is denoted as CVAVE, wherein ΔCVAVE is defined by the following formula: ΔCVAVE=CVAVE (Δ≥0)−CVAVE (Δ=0), and wherein ΔCVAVE is 0.03 or less.

15. The light-emitting device according to claim 1, wherein the lens comprises an oxide glass containing $SiO_2$ in an amount of 70 mol % or less, a first joining film comprising silicon oxide is disposed on the light emission surface, and a second joining film comprising silicon oxide is disposed on the opposing surface of the lens, and each of the first joining film and the second joining film has a thickness of 1 nm to 100 nm.

16. A method of manufacturing a light-emitting device, the method comprising:

preparing a light-emitting element having a rectangular light emission surface;

preparing a lens including an opposing surface facing the light-emitting element and a convex surface oriented in an opposite direction to the opposing surface, a circumferential edge of the convex surface being circular as seen in a direction perpendicular to the light emission surface;

determining, based on a length L of a shortest edge of the light emission surface and a diameter R of the circumferential edge of the convex surface, a ratio r=R/L;

setting an allowable range of a distance Δ between a center of the convex surface and a center of the light emission surface to satisfy 0<Δ≤450/r; and joining the lens to the light-emitting element such that the distance Δ is within the allowable range.

* * * * *